United States Patent

[11] 3,547,161

| [72] | Inventors | Donald Reece;<br>George J. Boyle, Cheshire, England |
|---|---|---|
| [21] | Appl. No. | 793,826 |
| [22] | Filed | Jan. 24, 1969 |
| [45] | Patented | Dec. 15, 1970 |
| [73] | Assignee | Shell Oil Company<br>New York, N.Y.<br>a corporation of Delaware |
| [32] | Priority | Feb. 20, 1968 |
| [33] | | Great Britain |
| [31] | | No. 8150/68 |

[54] INSULATED PIPELINE FOR TRANSPORTING LIQUID NATURAL GAS
6 Claims, 2 Drawing Figs.

[52] U.S. Cl. ............................................. 138/114,
138/149
[51] Int. Cl. ............................................. F16l 9/18

[50] Field of Search .......................................... 138/114,
148, 149

[56] References Cited
UNITED STATES PATENTS

| 2,969,092 | 1/1961 | Johnston ..................... | 138/149 |
| 3,388,724 | 6/1968 | Mowell et al. ................ | 138/149 |
| 3,397,720 | 8/1968 | Jones............................ | 138/149 |
| 3,426,803 | 2/1969 | Kikukawa..................... | 138/114 |

*Primary Examiner*—Louis K. Rimrodt
*Attorneys*—Louis J. Bovasso and J. H. McCarthy ABSTRACT: A pipeline for transporting a low density, low temperature liquid comprising substantially concentric inner and outer tubular members forming an annulus therebetween. The liquid is adapted to be passed through the inner tubular member and a partial vacuum is formed in the annulus, the annulus being filled with thermal insulant having a bulk density in excess of 50 pounds per cubic foot.

PATENTED DEC 15 1970　　　　　　　　　　　　3,547,161

INVENTORS:
DONALD REECE
GEORGE J. BOYLE
BY: Louis J. Bovasso
THEIR ATTORNEY

INSULATED PIPELINE FOR TRANSPORTING LIQUID NATURAL GAS

BACKGROUND OF THE INVENTION

1. Field of the Invention

The present invention relates to a thermally insulated pipeline for the transport of a low temperature liquid; and, more particularly, to an underwater thermally insulated pipeline for transporting liquid natural gas (LNG).

2. Description of the Prior Art

Sea transport of LNG between producer countries and consumer countries requires suitable loading and unloading facilities for ships. In many areas, LNG is found where the cost of providing deep water facilities for large ships is prohibitive. In such cases, it is desirable to use underwater pipelines from the shore to a deep water buoy or anchorage. The pipelines must be provided with adequate thermal insulation. A difficulty with underwater LNG pipelines arises from the fact that LNG itself is a low density liquid and, in order to counteract the natural buoyancy of a pipeline carrying such a product, the pipeline must be weighted in order that it will sink to its underwater position.

SUMMARY OF THE INVENTION

It is an object of this invention to provide an insulated pipeline for transporting a low density, low temperature liquid.

It is further object of this invention to provide an insulated pipeline in which the insulant provides a major part of the weight of the pipeline so as to ensure that when the pipeline is submerged it remains in its allocated position.

According to one aspect of the present invention, a thermally insulated pipeline for the transport of a low density, low temperature liquid, such as liquid natural gas, comprises substantially coaxial inner and outer tubes, the annular region therebetween being a partial vacuum containing a thermal insulant having a bulk density in excess of 50 pounds per cubic foot. Preferably, the insulant comprises finely divided powdered barite particles of less than 50 microns size.

It is known that certain finely divided powders serve as good thermal insulants. Most conventional thermal insulating powders, e.g. silica aerogel and expanded perlite, have low bulk densities of the order 5—20 per cubic foot. For an LNG underwater pipeline, the use of such insulants would require a heavyweight outer coating encasing the insulant in order to sink the pipeline. The present invention overcomes this problem by utilizing a powder having a bulk density approaching or exceeding the density of water. The powder now serves two functions, namely heat insulation and weight. As a result, the weight of the outer coating can be reduced. However, high density powders are not as effective heat insulants as perlite or polyurethane foam, for example, and in order to provide adequate insulation with high density powders, the thickness of the insulant would have to be increased to such an extent as to make the manufacture and handling of the pipeline difficult due to its increased overall diameter. By reducing the pressure within the annular region containing the insulant, the thermal conductivity of the region is improved resulting in a consequent reduction in thickness of the insulant. Suitable high bulk density powders applicable to the present invention and having bulk densities in excess of 50 pounds per cubic foot are barite and alumina.

DESCRIPTION OF THE PREFERRED EMBODIMENT

Figure 1:
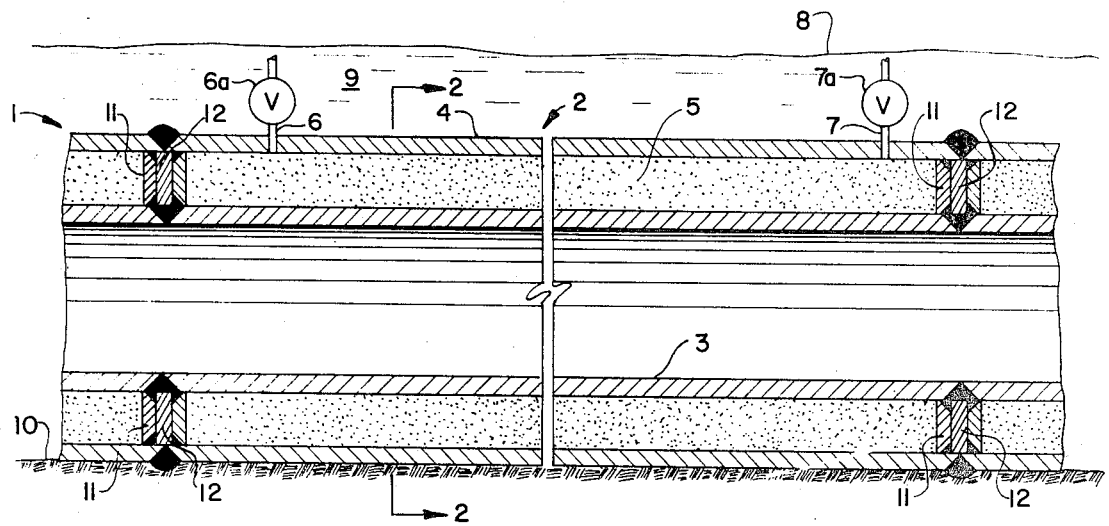
FIG. 1 is a vertical sectional view of a pipeline for transporting a low density, low temperature liquid in accordance with the teachings of my invention.

Referring now to the drawing, FIG. 1 shows a pipeline 1 which is adapted to convey liquids therethrough. For example, as discussed hereinabove and in accordance with the teachings of my invention, pipeline 1 is particularly adapted to transport a low density, low temperature liquid, such as liquid natural gas (LNG), therethrough.

Figure 2:
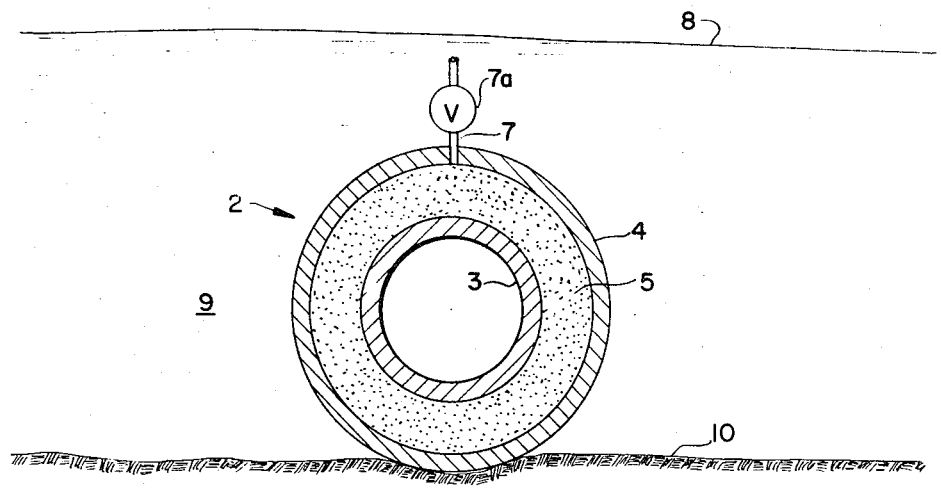
FIG. 2 is an end view of the pipeline of FIG. 1.

Thus, pipeline 1 may be disposed below the surface 8 of a body of water 9, such as an ocean, resting on the ocean bottom 10. Preferably, pipeline 1 may be assembled from a plurality of discrete lengths of pipe, each pipe length 2, for example being on the order of 60 feet or so in length. Each length 2 comprises substantially concentric inner 3 and outer 4 tubes (FIG. 2) with the annulus 5 therebetween being filled with a thermal insulant having a bulk density in excess of 50 pounds per cubic foot, as for example finely divided powdered barite. The powder size is preferably less than 50 microns, and preferably a major part of the powder is less than 5 microns. The outer tube 4 may be formed from a conventional steel but the inner tube 3, which in use is in contact with the LNG must be formed from a material which is adapted to withstand the strains arising from low temperatures. Suitable materials for inner tube 3 are invar, aluminum and stainless steel containing approximately 9 percent weight nickel. Invar is the preferred material due to its extremely small coefficient of expansion. If stainless steel is employed for the inner tube 3, then some form of expansion and contraction joint (not shown) must be incorporated between the pipe lengths. The ends of each length of pipe are closed by annular caps 11, preferably of invar, to contain the insulant in position. The pipe lengths 2 are preferably welded together to form the pipeline 1, gaps between adjacent end caps 11 of abutting pipe lengths 2 being sealed with a suitable insulant 12 prior to welding.

In order to provide effective insulation while at the same time keeping the overall diameter of the pipeline 1 within manageable proportions, it is necessary to create and maintain a partial vacuum within the interior of the annulus 5 of each pipe length 2. A partial vacuum may be created within each region by exhausting air therefrom, as for example by means of a vacuum pump. Alternatively, a partial vacuum may be created by known cryopumping techniques. In cryopumping, the air within each annular region is displaced by a vapor and the region is then sealed. For the introduction of a vapor and the expulsion of the air, each pipe length 2 may be provided, one at each end, with ports 6 and 7, the ports 6 and 7 being adapted to be opened and closed by suitable valve means 6a and 7a, respectively. The displacement of air from within the annulus 5 of each pipe length 2 preferably is done prior to the assembly of the pipeline 1. Upon assembly of the pipeline 1, and with LNG flowing along the inner tube 3, the resulting temperature drop produces a partial vacuum within the various annuli 5. By cryopumping, it is possible to achieve pressures of as low as 10, 1.0 and 0.1 mm. mercury in the annuli 5. Thus, ports 6 and 7 may be coupled to suitable vacuum pumping means (not shown) for maintaining a partial vacuum in annulus 5. Of course, ports 6 and 7 may be closed by valve means 6a and 7a after a partial vacuum has been created so as to maintain the vacuum within annulus 5.

With pipeline 1 lying underwater, if small leaks occur in the outer tube 4, only a very small quantity of water enters the annulus 5 containing the insulant before the formation of ice effectively seals the leaks.

EXAMPLES

Table 1 sets out the densities and thermal conductivities of various barites and alumina powders at different pressures, which may be used in accordance with the teachings of my invention. The thermal conductivity of a polyurethane foam, known to be an efficient heat insulant, is approximately $2.0 \times 10^{-2}$ Btu/ft/°

TABLE 1

| Powder | Particle size | Bulk density, lb./cu. ft. | Pressure, mm. Hg | Thermal conductivity, B.t.u./ft./° F./hr. |
|---|---|---|---|---|
| Barites | 96% <5μ | 122 | 0.10 | $0.31 \times 10^{-2}$ |
|  |  |  | 1.0 | $0.48 \times 10^{-2}$ |
|  |  |  | 10.0 | $0.84 \times 10^{-2}$ |
|  |  |  | 34.5 | $1.54 \times 10^{-2}$ |
|  |  |  | 102.5 | $2.34 \times 10^{-2}$ |
|  |  |  | 495 | $3.97 \times 10^{-2}$ |
| Alumina | 96% <5μ | 61 | 0.06 | $0.31 \times 10^{-2}$ |
|  |  |  | 0.40 | $0.36 \times 10^{-2}$ |
|  |  |  | 1.0 | $0.44 \times 10^{-2}$ |
|  |  |  | 10.0 | $0.91 \times 10^{-2}$ |
|  |  |  | 100 | $2.66 \times 10^{-2}$ |
|  |  |  | 481 | $4.42 \times 10^{-2}$ |
| Barites | <300 mesh | 153 | 0.1 | $0.54 \times 10^{-2}$ |
|  |  |  | 1.0 | $0.77 \times 10^{-2}$ |
|  |  |  | 4.75 | $1.14 \times 10^{-2}$ |
|  |  |  | 10 | $1.78 \times 10^{-2}$ |
|  |  |  | 103.5 | $5.44 \times 10^{-2}$ |
| Alumina | do | 61 | 0.06 | $0.38 \times 10^{-2}$ |
|  |  |  | 0.45 | $0.64 \times 10^{-2}$ |
|  |  |  | 1.0 | $0.78 \times 10^{-2}$ |
|  |  |  | 5.0 | $2.70 \times 10^{-2}$ |
|  |  |  | 10.0 | $3.53 \times 10^{-2}$ |

Table 2 below sets out the required thermal conductivities K for insulation layers for different pipelines.
Conditions - Liquid velocity 10 feet/second.
Line pressure 200 pounds/square inch.

TABLE 2

| Pipeline dimensions | | | Maximum K in B.t.u./ft./° F./hr. for temperature rise of— | | |
|---|---|---|---|---|---|
| Length, miles | I.D., in. | Insulating layer, in. | 2° F. | 4° F. | 6° F. |
| 5 | 12 | 2 | $0.73 \times 10^{-2}$ | $1.46 \times 10^{-2}$ | $2.20 \times 10^{-2}$ |
| 5 | 24 | 2 | $1.46 \times 10^{-2}$ | $2.93 \times 10^{-2}$ | $4.40 \times 10^{-2}$ |
| 10 | 12 | 2 | $0.36 \times 10^{-2}$ | $0.73 \times 10^{-2}$ | $1.10 \times 10^{-2}$ |
| 10 | 24 | 2 | $0.73 \times 10^{-2}$ | $1.46 \times 10^{-2}$ | $2.20 \times 10^{-2}$ |

We claim:
1. A pipeline for transporting a low density, low temperature liquid comprising substantially concentric inner and outer tubular members forming an annulus therebetween, said annulus having a partial vacuum formed therein with said annulus being filled with a powdered thermal insulant comprising finely divided particles of less than 50 microns in size having a bulk density in excess of 50 pounds per cubic foot.
2. The pipeline of claim 1 in which the thermal insulant is finely divided barite particles.
3. The pipeline of claim 2 in which a major portion of the barite particles are less than 5 microns size.
4. The pipeline of claim 1 in which the termal insulant is finely divided alumina particles.
5. The pipeline of claim 4 in which a major portion of the alumina particles are less than 5 microns size.
6. The pipeline of claim 1 in which the pressure in said annulus is below 10 mm. mercury.